(12) United States Patent
Stanjek et al.

(10) Patent No.: US 10,030,183 B2
(45) Date of Patent: Jul. 24, 2018

(54) CROSS-LINKABLE MASSES BASED ON ORGANYL-OXYSILANE-TERMINATED POLYMERS

(71) Applicant: Wacker Chemie AG, Munich (DE)

(72) Inventors: Volker Stanjek, Ampfing (DE); Lars Zander, Altoetting (DE)

(73) Assignee: WACKER CHEMIE AG, Munich (DE)

( * ) Notice: Subject to any disclaimer, the term of this patent is extended or adjusted under 35 U.S.C. 154(b) by 11 days.

(21) Appl. No.: 15/304,338

(22) PCT Filed: Apr. 10, 2015

(86) PCT No.: PCT/EP2015/057853
§ 371 (c)(1),
(2) Date: Oct. 14, 2016

(87) PCT Pub. No.: WO2015/158624
PCT Pub. Date: Oct. 22, 2015

(65) Prior Publication Data
US 2017/0044410 A1    Feb. 16, 2017

(30) Foreign Application Priority Data
Apr. 17, 2014    (DE) .................. 10 2014 207 506

(51) Int. Cl.
| | | |
|---|---|---|
| C09J 183/12 | (2006.01) | |
| C08G 77/08 | (2006.01) | |
| C09J 183/10 | (2006.01) | |
| B05D 3/10 | (2006.01) | |
| C08G 77/26 | (2006.01) | |
| C08G 77/458 | (2006.01) | |
| C08G 77/46 | (2006.01) | |
| C08K 3/22 | (2006.01) | |
| C08K 3/26 | (2006.01) | |
| C08K 3/34 | (2006.01) | |

(52) U.S. Cl.
CPC ............ *C09J 183/12* (2013.01); *B05D 3/108* (2013.01); *C08G 77/08* (2013.01); *C09J 183/10* (2013.01); *C08G 77/26* (2013.01); *C08G 77/458* (2013.01); *C08G 77/46* (2013.01); *C08K 3/22* (2013.01); *C08K 3/26* (2013.01); *C08K 3/34* (2013.01); *C08K 2003/2227* (2013.01); *C08K 2003/265* (2013.01)

(58) Field of Classification Search
None
See application file for complete search history.

(56) References Cited

U.S. PATENT DOCUMENTS

| | | |
|---|---|---|
| 6,884,852 B1 | 4/2005 | Klauck et al. |
| 8,101,704 B2 | 1/2012 | Baumann et al. |
| 2005/0119436 A1 | 6/2005 | Ziche et al. |
| 2007/0167598 A1 | 7/2007 | Stanjek et al. |
| 2009/0264612 A1* | 10/2009 | Stanjek .................. C08G 77/26 528/38 |
| 2012/0067520 A1* | 3/2012 | Schubert ................ C08B 15/05 156/329 |
| 2014/0155545 A1 | 6/2014 | Stanjek et al. |
| 2015/0007938 A1 | 1/2015 | Stanjek et al. |

FOREIGN PATENT DOCUMENTS

| | | |
|---|---|---|
| DE | 10 2011 006 130 A1 | 9/2012 |
| DE | 10 2011 081 264 A1 | 2/2013 |
| DE | 10 2011 087 604 A1 | 6/2013 |
| DE | 10 2012 201 734 A1 | 8/2013 |
| EP | 1 093 482 A1 | 4/2001 |
| EP | 1 535 940 B1 | 6/2005 |
| EP | 1 641 854 B1 | 4/2006 |
| EP | 1 896 523 B1 | 3/2008 |

\* cited by examiner

*Primary Examiner* — Erma C Cameron
(74) *Attorney, Agent, or Firm* — Brooks Kushman P.C.

(57) ABSTRACT

RTV-1 compositions, despite containing conventional alkoxysilyl-terminated polymers, exhibit rapid cure and excellent physical properties when they further contain silicone resins, and employ metal, amidine, or guanidine curing catalysts C1 and amine-containing cocatalysts C2 in specific mole ratios.

14 Claims, No Drawings

CROSS-LINKABLE MASSES BASED ON ORGANYL-OXYSILANE-TERMINATED POLYMERS

CROSS REFERENCE TO RELATED APPLICATIONS

This application is the U.S. National Phase of PCT Appln. No. PCT/EP2015/057853 filed Apr. 10, 2015, which claims priority to German Application No. 10 2014 207 506.8 filed Apr. 17, 2014, the disclosures of which are incorporated in their entirety by reference herein.

BACKGROUND OF THE INVENTION

1. Field of the Invention

The invention relates to crosslinkable compositions of silane-crosslinking prepolymers, to processes for producing them, and to the use thereof as adhesives and sealants, especially for the bonding of substrates.

2. Description of the Related Art

Polymer systems which possess reactive alkoxy silyl groups have a long history. On contact with water or atmospheric moisture, these alkoxy silane-terminated polymers are capable even at room temperature of undergoing condensation with one another, accompanied by elimination of the alkoxy groups. One of the most important applications of such materials is the production of adhesives.

Adhesives based on alkoxy silane-crosslinking polymers, then, in the fully cured state exhibit not only good qualities of adhesion to a number of substrates, but also very good mechanical properties, being capable of being not only highly elastic but also of possessing tensile strength. Another critical advantage of silane-crosslinking systems relative to numerous other adhesive and sealant technologies (to isocyanate-crosslinking systems, for example) is the non-objectionable toxicological properties of the prepolymers.

Numerous applications prefer one-component systems (1K systems) which cure on contact with atmospheric moisture. The key advantages of one-component systems are above all their very great ease of application, since in this case there is no need for the user to mix different adhesive components. In addition to the saving in time/labor and the reliable avoidance of possible metering errors, there is also no need, with one-component systems, to process the adhesive/sealant within a usually fairly narrow time window, as is the case with multicomponent systems after the two components have been thoroughly mixed.

One particular variant of adhesives based on alkoxy silane-crosslinking polymers is described in DE-A 10 2011 006130 and also DE-A 10 2011 081264, comprising phenyl silicone resins as well as the silane-crosslinking polymers. The corresponding resin additives not only improve the adhesion on numerous different substrates, but also lead—particularly with the high resin contents described in DE-A 10 2011 081264—to adhesives, which following their complete curing, exhibit considerably improved hardness and tensile shear strength.

Nevertheless, the systems actually described in the prior art are confined to materials which comprise polymers having what are called alpha-alkoxy silane groups, where the alkoxy silyl group is separated only by one $CH_2$ group from a heteroatom. This particular type of polymer is distinguished by particularly high reactivity, and so the use of high-activity catalysts, such as organotin compounds, amidine or guanidine derivatives, for example, is unnecessary. This is very advantageous insofar as high-activity catalysts may catalyze exchange reactions in which Si—O—Si bonds of the added phenyl silicone resins react with the Si—$OCH_3$ groups of the alkoxy silane-functional polymers. Exchange reactions of this kind will form Si—O—Si bonds between the alkoxy silane-functional polymers, possibly leading to a drastic increase in viscosity or to complete gelling of the material. The corresponding formulation would no longer be stable on storage.

A further disadvantage of these systems described in the prior art, however, is that almost no commercially available types of polymers contain the required high-reactivity alpha-alkoxy silane groups, instead possessing what are called gamma-alkoxy silane groups, in which the alkoxy silane unit is connected by a $(CH_2)_3$ spacer to the adjacent heteroatom. This means a massive restriction on the raw materials which can be used, particularly since the few alpha-alkoxy silane-functional polymers that are available commercially also have systemic disadvantages such as, for example, comparatively high costs, as a consequence of their production, or else comparatively poor resilience. There are many profiles of properties that cannot be produced with the existing technology, therefore.

SUMMARY OF THE INVENTION

The invention provides crosslinkable compositions comprising (A) 100 parts by weight of compounds of the formula

  (I), where
Y is an b-valent polymer radical bonded via nitrogen, oxygen, sulfur or carbon,
R may be identical or different and is a monovalent, optionally substituted hydrocarbon radical,
$R^1$ may be identical or different and is hydrogen or a monovalent optionally substituted hydrocarbon radical, which may be attached via nitrogen, phosphorus, oxygen, sulfur or carbonyl group to the carbon atom,
$R^2$ may be identical or different and is hydrogen or a monovalent, optionally substituted hydrocarbon radical,
b is an integer from 1 to 10, preferably 1, 2 or 3, more preferably 1 or 2, and
a may be identical or different and is 0, 1 or 2, preferably 0 or 1,
(B) at least 5 parts by weight of silicone resins comprising units of the formula

  (II)

where
$R^3$ may be identical or different and is hydrogen, a monovalent, SiC-bonded, optionally substituted aliphatic hydrocarbon radical or a divalent, optionally substituted, aliphatic hydrocarbon radical which bridges two units of the formula (II),
$R^4$ may be identical or different and is hydrogen or a monovalent, optionally substituted hydrocarbon radical,
$R^5$ may be identical or different and is a monovalent, SiC-bonded, optionally substituted aromatic hydrocarbon radical,
c is 0, 1, 2 or 3,
d is 0, 1, 2 or 3, preferably 0, 1 or 2, more preferably 0 or 1, and
e is 0, 1 or 2, preferably 0 or 1,
with the proviso that
the sum of c+d+e is less than or equal to 3 and in at least 40% of the units of the formula (II) the sum c+e is 0 or 1, (C1) catalyst selected from metal-containing curing catalysts, guanidines, and amidines, and
(C2) cocatalyst comprising units of the formula

  (III), in which
R⁶ may be identical or different and is a monovalent, optionally substituted SiC-bonded, nitrogen-free organic radical,
R⁷ may be identical or different and is hydrogen or optionally substituted hydrocarbon radicals,
D may be identical or different and is a monovalent, SiC-bonded radical having at least one nitrogen atom not bonded to a carbonyl group (C=O),
f is 0, 1, 2 or 3, preferably 1,
g is 0, 1, 2 or 3, preferably 1, 2 or 3, more preferably 1 or 3, and
h is 0, 1, 2, 3 or 4, preferably 1,
with the proviso that the sum of f+g+h is less than or equal to 4 and per molecule there is at least one radical D present, where the molar ratio of compounds (C1) to radicals D in compounds (C2) is 1:1 to 1:400 and the crosslinkable composition comprises components (C1) and (C2) in a total amount of 0.2 to 50 parts by weight per 100 parts by weight of component (A).

DETAILED DESCRIPTION OF THE PREFERRED EMBODIMENTS

The invention is based on the surprising finding that through the use of the catalyst combination of the invention, made up of catalyst (C1) and cocatalyst (C2), it is possible to obtain compositions based on the polymers (A) of the invention and silicone resins (B) that not only enjoy sufficient storage stability but also crosslink and cure rapidly on contact with atmospheric moisture.

Examples of radicals R are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals; hexyl radicals such as the n-hexyl radical; heptyl radicals such as the n-heptyl radical; octyl radicals such as the n-octyl radical, isooctyl radicals, and the 2,2,4-trimethylpentyl radical; nonyl radicals such as the n-nonyl radical; decyl radicals, such as the n-decyl radical; dodecyl radicals such as the n-dodecyl radical; octadecyl radicals such as the n-octadecyl radical; cycloalkyl radicals such as the cyclopentyl, cyclohexyl, cycloheptyl and methylcyclohexyl radicals; alkenyl radicals such as the vinyl, 1-propenyl, and 2-propenyl radical; aryl radicals such as the phenyl, naphthyl, anthryl, and phenanthryl radicals; alkaryl radicals such as the o-, m-, and p-tolyl radicals, xylyl radicals and ethylphenyl radicals; and aralkyl radicals such as the benzyl radical the α- and the β-phenylethyl radicals.

Examples of substituted radicals R are haloalkyl radicals such as the 3,3,3-trifluoro-n-propyl radical, the 2,2,2,2',2',2'-hexafluoroisopropyl radical, and the heptafluoroisopropyl radical, and haloaryl radicals such as the o-, m-, and p-chlorophenyl radical.

Radical R preferably comprises optionally halogen-atom-substituted, monovalent hydrocarbon radicals having 1 to 6 carbon atoms, more preferably alkyl radicals having 1 or 2 carbon atoms, most preferably the methyl radical.

Examples of radicals R¹ are hydrogen, the radicals indicated for R, and also optionally substituted hydrocarbon radicals bonded via nitrogen, phosphorus, oxygen, sulfur, carbon or a carbonyl group to the carbon atom.

Preferably radical R¹ is hydrogen or a hydrocarbon radicals having 1 to 20 carbons atoms, more particularly hydrogen.

Examples of radical R² are hydrogen or the examples indicated for radical R.

Radical R² preferably comprises hydrogen or optionally halogen-substituted alkyl radicals having 1 to 10 carbon atoms, more preferably alkyl radicals having 1 to 4 carbon atoms, most preferably the methyl and ethyl radical.

Polymers on which the polymer radical Y is based are, for the purposes of the present invention, all polymers in which at least 50%, preferably at least 70%, more preferably at least 90% of all the bonds in the main chain are carbon-carbon, carbon-nitrogen or carbon-oxygen bonds.

Examples of polymer radicals Y are polyester, polyether, polyurethane, polyalkylene, and polyacrylate radicals.

Polymer radical Y preferably comprises organic polymer radicals which comprise as their polymer chain polyoxyalkylenes such as polyoxyethylene, polyoxypropylene, polyoxybutylene, polyoxytetramethylene, polyoxyethylene-polyoxypropylene copolymer, and polyoxypropylene-polyoxybutylene copolymer; hydrocarbon polymers such as polyisobutylene and copolymers of polyisobutylene with isoprene; polychloroprenes; polyisoprenes; polyurethanes; polyesters; polyamides; polyacrylates; polymethacrylates; vinyl polymer, and polycarbonates, and which are bonded preferably via —O—C(=O)—NH—, —NH—C(=O)O—, —NH—C(=O)—NH—, —NR'—C(=O)—NH—, NH—C(=O)—NR'—, —NH—C(=O)—, —C(=O)—NH—, —C(=O)—O—, —O—C(=O)—, —O—C(=O)—O—, —S—C(=O)—NH—, —NH—C(=O)—S—, —C(=O)—S—, —S—C(=O)—, —S—C(=O)—S—, —C(=O)—, —S—, —O—, —NR'— to the group or groups —[(CR¹₂)₃—SiRₐ(OR²)₃₋ₐ], where R' may be identical or different and has a definition indicated for R, or is a group —CH(COOR")—CH₂—COOR", in which R" may be identical or different and has a definition indicated for R.

Radical R' is preferably a group —CH(COOR")—CH₂—COOR" or an optionally substituted hydrocarbon having from 1 to 20 carbon atoms, more preferably a linear, branched or cyclic alkyl group having 1 to 20 carbon atoms, or an optionally halogen-atom-substituted aryl group having 6 to 20 carbon atoms.

Examples of radicals R' are cyclohexyl, cyclopentyl, n- and isopropyl, n-, iso-, and t-butyl, the various stereoisomers of the pentyl radical, hexyl radical or heptyl radical, and the phenyl radical.

The radicals R" are preferably alkyl groups having 1 to 10 carbon atoms, more preferably methyl, ethyl or propyl radicals.

The component (A) here may have the groups —[(CR¹₂)₃—SiRₐ(OR²)₃₋ₐ], attached in the manner described, at any desired locations within the polymer, such as within the chain and/or terminally, for instance.

Radical Y preferably comprises polyurethane radicals or polyoxyalkylene radicals, more preferably catenated polyurethane radicals or catenated polyoxyalkylene radicals having in each case 0 to 3 branching sites with terminally attached groups —[(CR¹₂)ᵦ—SiRₐ(OR²)₃₋ₐ], branching sites in the sense of the invention referring to all branches starting from the main chain and having more than one carbon atom, and the radicals and indices having the definitions stated above.

More particularly, radical Y in formula (I) comprises catenated polyurethane radicals or catenated polyoxyalkylene radicals without branching sites having terminally attached groups —[(CR$^1_2$)$_b$—SiR$_a$(OR$^2$)$_{3-a}$], the radicals and indices having the definitions stated above.

The polyurethane radicals Y are preferably radicals whose chain ends are bonded via —NH—C(=O)O—, —NH—C(=O)—NH—, —NR'—C(=O)—NH— or —NH—C(=O)—NR'—, more preferably via —O—C(=O)—NH— or —NH—C(=O)—NR'—, to the group or groups —[(CR$^1_2$)$_3$—SiR$_a$(OR$^2$)$_{3-a}$], with all of the radicals and indices having one of the above definitions. These polyurethane radicals Y are preferably preparable from linear or branched polyoxyalkylenes, more particularly from polypropylene glycols, and di- or polyisocyanates. The radicals Y preferably have average molar masses M$_n$ (number average) of 400 to 30,000 g/mol, more preferably 4000 to 20,000 g/mol. Suitable processes for producing such a component (A), and also examples of component (A) themselves, are described in references including EP 1 093 482 B1 (paragraphs [0014]-[0023], [0039]-[0055] and also inventive example 1 and comparative example 1) or EP 1 641 854 B1 (paragraphs [0014]-[0035], inventive examples and 6, and comparative examples 1 and 2), which are incorporated herein by reference.

The number-average molar mass M$_n$ is determined for the purposes of the present invention by means of Size Exclusion Chromatography (SEC) against polystyrene standard, in THF, at 60° C., flow rate 1.2 ml/min, with detection by RI (refractive index detector) on a Styragel HR3-HR4-HR5-HR5 column set from Waters Corp. USA, with an injection volume of 100 μl.

The polyoxyalkylene radicals Y are preferably linear or branched polyoxyalkylene radicals, more preferably polyoxypropylene radicals, whose chain ends are bonded preferably via —O—C(=O)—NH— or —O— to the group or groups —[(CR$^1_2$)$_3$—SiR$_a$(OR$^2$)$_{3-a}$], the radicals and indices having one of the definitions stated above. Preferably, at least 85%, more preferably at least 90%, and most preferably at least 95%, of all chain ends are bonded by an —O—C(=O)—NH— to the group —[(CR$^1_2$)$_3$—SiR$_a$(OR$^2$)$_{3-a}$]. The polyoxyalkylene radicals Y preferably have average molar masses M$_n$ of 4000 to 30,000 g/mol, more preferably of 8000 to 20,000 g/mol. Suitable processes for producing such a component (A), and also examples of component (A) itself, are described in references including EP 1 535 940 B1 (paragraphs [0005]-[0025] and also inventive examples 1 and 3 and comparative examples 1-4) or EP 1 896 523 B1 (paragraphs [0008]-[0047]), which are incorporated herein by reference.

The end groups of the compounds (A) used in accordance with the invention are preferably groups of the general formulae $$—NH—C(=O)—NR'—(CR^1_2)_3—SiR_a(OR^2)_{3-a} \quad (IV),$$

$$—O—C(=O)—NH—(CR^1_2)_3—SiR_a(OR^2)_{3-a} \quad (V) \text{ or}$$

$$—O—(CR^1_2)_3—SiR_a(OR^2)_{3-a} \quad (VI),$$

where the radicals and indices have one of the definitions indicated for them above.

Where compounds (A) are polyurethanes, as is preferred, they preferably have one or more of the following end groups
—NH—C(=O)—NR'—(CH$_2$)$_3$—Si(OCH$_3$)$_3$,
—NH—C(=O)—NR'—(CH$_2$)$_3$—Si(OC$_2$H$_5$)$_3$,
—O—C(=O)—NH—(CH$_2$)$_3$—Si(OCH$_3$)$_3$ or
—O—C(=O)—NH—(CH$_2$)$_3$—Si(OC$_2$H$_5$)$_3$,
where R' has the definition stated above.

Where the compounds (A) are polypropylene glycols, which is likewise preferred, they preferably have one or more of the following end groups
—O—(CH$_2$)$_3$—Si(CH$_3$)(OCH$_3$)$_2$,
—O—(CH$_2$)$_3$—Si(OCH$_3$)$_3$,
—O—C(=O)—NH—(CH$_2$)$_3$—Si(OC$_2$H$_5$)$_3$,
—O—C(=O)—NH—(CH$_2$)$_3$—Si(OCH$_3$)$_3$ or
—O—C(=O)—NH—(CH$_2$)$_3$—Si(CH$_3$)(OCH$_3$)$_2$.

The average molecular weights M$_n$ of the compounds (A) are preferably at least 400 g/mol, more preferably at least 4000 g/mol, and most preferably at least 10,000 g/mol, and preferably not more than 30,000 g/mol, more preferably not more than 20,000 g/mol, and most preferably not more than 19,000 g/mol.

The viscosity of the compounds (A) is preferably at least 0.2 Pas, more preferably at least 1 Pas, and most preferably at least 5 Pas, and preferably not more than 700 Pas, more preferably not more than 100 Pas, measured in each case at 20° C.

The viscosity for the purposes of the present invention is determined after conditioning at 23° C. with a DV 3 P rotary viscometer from A. Paar (Brookfield systems), using spindle 5 at 2.5 rpm in accordance with ISO 2555.

The compounds (A) used in accordance with the invention are commercial products or may be produced by methods which are common in chemistry.

The polymers (A) may be produced by known methods such as addition reactions, for example, hydrosilylation, Michael addition, Diels-Alder addition, or reactions between isocyanate-functional compounds with compounds which have isocyanate-reactive groups.

The component (A) used in accordance with the invention may comprise only one kind of compound of the formula (I) or else mixtures of different kinds of compounds of the formula (I). In this case the component (A) may comprise exclusively compounds of the formula (I) in which more than 90%, preferably more than 95%, and more preferably more than 98% of all silyl groups bonded to the radical Y are identical. Alternatively in that case a component (A) may be used which comprises at least partly compounds of the formula (I) in which different silyl groups are bonded to a radical Y. Lastly as component (A) it is also possible to use mixtures of different compounds of the formula (I) in which a total of at least two different kinds of silyl groups bonded to radicals Y are present, but with all silyl groups bonded to one radical Y being identical.

The compositions of the invention preferably comprise compounds (A) in concentrations of at most 60 wt %, more preferably at most 40 wt %, and preferably at least 10 wt %, more preferably at least 15 wt %.

Based on 100 parts by weight of component (A), the compositions of the invention comprise preferably at least 10 parts by weight, more preferably at least 15 parts by weight, of component (B). Based on 100 parts by weight of component (A), the compositions of the invention preferably comprise not more than 200 parts by weight, more preferably not more than 60 parts by weight, and most preferably not more than 50 parts by weight, of component (B).

Component (B) consists preferably to an extent of at least 90 wt % of units of the formula (II). More preferably component (B) or (B1) consists exclusively of units of the formula (II).

Examples of radicals R$^3$ are the aliphatic examples indicated above for R. Radical R$^3$ may alternatively comprise divalent aliphatic radicals which join two silyl groups of the formula (II) to one another, such as alkylene radicals having 1 to 10 carbon atoms, for example methylene, ethylene, propylene or butylene radicals. A particularly common example of a divalent aliphatic radical is the ethylene radical.

Preferably, however, radical $R^3$ comprises optionally halogen-substituted, monovalent, SiC-bonded aliphatic hydrocarbon radicals having 1 to 18 carbon atoms, more preferably aliphatic hydrocarbon radicals having 1 to 6 carbon atoms, more particularly the methyl radical.

Examples of radical $R^4$ are hydrogen or the examples indicated for radical R.

Radical $R^4$ preferably comprises hydrogen or optionally halogen-atom-substituted alkyl radicals having 1 to 10 carbon atoms, more preferably alkyl radicals having 1 to 4 carbon atoms, more particularly the methyl and ethyl radical.

Examples of radicals $R^5$ are the aromatic radicals indicated above for R.

Radical $R^5$ preferably comprises optionally halogen-atom-substituted, SiC-bonded aromatic hydrocarbon radicals having 1 to 18 carbon atoms, such as ethylphenyl, tolyl, xylyl, chlorophenyl, naphthyl or styryl radicals, more preferably the phenyl radical.

Preferred for use as component (B) are silicone resins in which at least 90% of all radicals $R^3$ are methyl radicals.

Preferred for use as component (B) are silicone resins in which at least 90% of all radicals $R^4$ are methyl, ethyl, propyl or isopropyl radicals.

Preferred for use as component (B) are silicone resins in which at least 90% of all radicals $R^5$ are phenyl radicals.

Preference is given in accordance with the invention to using silicone resins (B) which have at least 20%, more preferably at least 40%, of units of the formula (II) in which c is 0, based in each case on the total number of units of the formula (II).

Preference is given to using silicone resins (B) which, based in each case on the total number of units of the formula (II), have at least 70%, more preferably at least 80%, of units of the formula (II) in which d is 0 or 1.

Preference is given to the use as component (B) of silicon resins (B1) which, based in each case on the total number of units of the formula (II), have at least 20%, more preferably at least 40%, and most preferably at least 50% of units of the formula (II) in which e is 1.

One particular embodiment of the invention uses silicone resins (B1) which have exclusively units of the formula (II) in which e is 1.

In one particularly preferred implementation of the invention, use is made as component (B1) of silicon resins which, based in each case on the total number of units of the formula (II), have at least 20%, more preferably at least 40%, and most preferably at least 50% of units of the formula (II) in which e is 1 and c is 0.

Examples of the silicone resins (B) used in accordance with the invention are organopolysiloxane resins which consist substantially, preferably exclusively, of units selected from (4) units of the formulae $SiO_{4/2}$, $Si(OR^4)O_{3/2}$, $Si(OR^4)_2O_{2/2}$, and $Si(OR^4)_3O_{1/2}$, (T) units of the formulae $PhSiO_{3/2}$, $PhSi(OR^4)O_{2/2}$, and $PhSi(OR^4)_2O_{1/2}$, (D) units of the formulae $Me_2SiO_{2/2}$ and $Me_2Si(OR^4)O_{1/2}$, and (M) units of the formula $Me_3SiO_{1/2}$, where Me is the methyl radical, Ph is the phenyl radical, and $R^4$ is hydrogen or an optionally halogen-substituted alkyl radical having 1 to 10 carbon atoms, preferably an unsubstituted alkyl radical having 1 to 4 carbon atoms, with the resin preferably containing 0-2 mol of (Q) units, 0-2 mol of (D) units, and 0-2 mol of (M) units per mole of (T) units.

Preferred examples of the silicone resins (B) used in accordance with the invention are organopolysiloxane resins which consist substantially, preferably exclusively, of units selected from T units of the formulae $PhSiO_{3/2}$, $PhSi(OR^4)O_{2/2}$, and $PhSi(OR^4)_2O_{1/2}$ and also T units of the formulae $MeSiO_{3/2}$, $MeSi(OR^4)O_{2/2}$, and $MeSi(OR^4)_2O_{1/2}$, where Me is the methyl radical, Ph is the phenyl radical, and $R^4$ is hydrogen or an optionally halogen-atom-substituted alkyl radical having 1 to 10 carbon atoms, preferably an unsubstituted alkyl radical having 1 to 4 carbon atoms.

Further preferred examples of the silicone resins (B) used in accordance with the invention are organopolysiloxane resins which consist substantially, preferably exclusively, of units selected from T units of the formulae $PhSiO_{3/2}$, $PhSi(OR^4)O_{2/2}$, and $PhSi(OR^4)_2O_{1/2}$, T units of the formulae $MeSiO_{3/2}$, $MeSi(OR^4)O_{2/2}$, and $MeSi(OR^4)_2O_{1/2}$, and also D units of the formulae $Me_2SiO_{2/2}$ and $Me_2Si(OR^4)O_{1/2}$, where Me is the methyl radical, Ph is the phenyl radical, and $R^4$ is hydrogen or an optionally halogen-substituted alkyl radical having 1 to 10 carbon atoms, preferably an unsubstituted alkyl radical having 1 to 4 carbon atoms, with a molar ratio of phenyl silicone to methyl silicone units of 0.5 to 4.0. The amount of D units in the silicon resins is preferably below 10 wt %.

Particularly preferred examples of the silicone resins (B1) used in accordance with the invention are organopolysiloxane resins which consist to an extent of 80%, preferably 90%, and more preferably exclusively of T units of the formulae $PhSiO_{3/2}$, $PhSi(OR^4)O_{2/2}$ and/or $PhSi(OR^4)_2O_{1/2}$, where Ph is the phenyl radical and $R^4$ is hydrogen or an optionally halogen-substituted alkyl radical having 1 to 10 carbon atoms, preferably an unsubstituted alkyl radical having 1 to 4 carbon atoms, based in each case on the total number of units.

The silicone resins (B) used in accordance with the invention preferably have an average molar mass (number average) $M_n$ of at least 400 g/mol and more preferably at least 600 g/mol. The average molar mass $M_n$ is preferably not more than 400,000 g/mol, more preferably not more than 10,000 g/mol, and most preferably not more than 3000 g/mol.

The silicone resins (B) used in accordance with the invention may be either solid or liquid at 23° C. and 1000 hPa, with silicone resins (B) preferably being liquid. Silicone resins (B) preferably possess a viscosity of 10 to 100,000 mPas, more preferably 50 to 50,000 mPas, and most preferably 100 to 20,000 mPas.

The silicone resins (B) preferably possess a polydispersity $(M_w/M_n)$ of at most 5, more preferably at most 3.

The mass-average molar mass $M_w$ is determined, like the number-average molar masses $M_n$, by means of Size Exclusion Chromatography (SEC) against polystyrene standard, in THF, at 60° C., flow rate 1.2 ml/min, with detection by RI (refractive index detector) on a Styragel HR3-HR4-HR5-HR5 column set from Waters Corp. USA, with an injection volume of 100 μl.

The silicone resins (B) may be used either in pure form or in the form of a mixture in a suitable solvent (BL).

Solvents (BL) which can be used are all compounds having a boiling point <250° C. at 1013 mbar which are not reactive toward components (A) and (B) at room temperature.

Examples of solvents (BL) are ethers (e.g., diethyl ether, methyl tert-butyl ether, ether derivatives of glycol, THF), esters (e.g., ethyl acetate, butyl acetate, glycol esters), aliphatic hydrocarbons (e.g., pentane, cyclopentane, hexane, cyclohexane, heptane, octane, or longer-chain branched and unbranched alkanes), ketones (e.g., acetone, methyl-ethyl ketone), aromatics (e.g., toluene, xylene, ethylbenzene, chlorobenzene) and alcohols (e.g., methanol, ethanol, glycol, propanol, isopropanol, glycerol, butanol, isobutanol, tert-butanol).

Many commercially available resins (B1) such as, for example the resins SILRES® SY 231, SILRES® IC 231, SILRES® IC 368 or SILRES® IC 678 from Wacker Chemie AG (D Munich), while liquid at 23° C. and 1013 hPa, nevertheless—as a consequence of their production—contain small amounts of solvents (BL), especially toluene. The resins identified above, for instance, contain about 0.1 wt % of toluene, based on the total weight of the resin.

In one preferred implementation of the invention, use is made as component (B) of component (B1) containing less than 0.1 wt %, preferably less than 0.05 wt %, more preferably less than 0.02 wt %, more particularly less than 0.01 wt %, of aromatic solvents (BL).

One particularly preferred implementation of the invention uses as component (B), a component (B1) containing, with the exception of alcohols $R^4OH$, less than 0.1 wt %, preferably less than 0.05 wt %, more preferably less than 0.02 wt %, and most preferably less than 0.01 wt %, of solvents (BL), with $R^4$ having the definition stated above.

One especially preferred implementation of the invention uses as component (B), resins (B1) containing, with the exception of alcohols $R^4OH$, no solvents (BL) at all, with $R^4$ being of the definition stated above, and with alcohols $R^4OH$ possibly being present, as a consequence of production, in amounts of preferably up to 10 wt %, more preferably up to 5 wt %.

The silicone resins (B) and/or (B1) used in accordance with the invention are commercial products or may be produced by methods which are common in silicon chemistry.

The compounds (A) described as being preferred or more preferred are preferably used in combination with resins (B1) in the stated proportions.

The catalysts (C1) used in the compositions of the invention may be any desired metal-containing curing catalysts, guanidines, and amidines that have been disclosed to date.

The metal-containing curing catalysts (C1) used in accordance with the invention are preferably organic titanium compounds and tin compounds.

Examples of the metal-containing curing catalysts (C1) are titanic esters such as tetrabutyl titanate, tetrapropyl titanate, tetraisopropyl titanate, and titanium tetraacetylacetonate; organotin compounds such as dibutyltin dilaurate, dibutyltin dimaleate, dibutyltin diacetate, dibutyltin dioctanoate, dibutyltin acetylacetonate, dibutyltin oxides, dibutyltin ethylhexanolate, dibutyltin distearate, dioctyltin dilaurate, dioctyltin maleate, dioctyltin diacetate, dioctyltin dioctanoate, dioctyltin acetylacetonate, dioctyltin oxides, dioctyltin ethylhexanolate or dioctyltin distearate, and tin(II) salts, especially tin(II) carboxylates.

The catalysts (C1) of the invention that are used may also be amidines such as 1,5-diazabicyclo[4.3.0]non-5-ene (DBN) and 1,8-diazabicyclo[5.4.0]undec-7-ene (DBU) or guanidines, such as 1,3-diphenylguanidine, 1,1,2-trimethylguanidine, 1,2,3-trimethylguanidine, 1,1,3,3-tetramethylguanidine, 1,1,2,3,3-pentamethylguanidine, 2-ethyl-1,1,3,3-tetramethylguanidine, 2-butyl-1,1,3,3-tetramethylguanidine, and 1,5,7-triazabicyclo[4.4.0]dec-5-ene, and also the various 7-alkyl-1,5,7-triazabicyclo[4.4.0]dec-5-ene derivatives.

The catalysts (C1) used in accordance with the invention are preferably titanium-containing compounds, tin-containing compounds, amidines, and guanidines, more preferably tin-containing compounds, amidines, and guanidines, more particularly tin-containing compounds.

The catalysts (C1) for use in accordance with the invention are commercial products.

The cocatalysts (C2) used in the compositions of the invention may be either silanes, i.e., compounds of the formula (III) with f+g+h=4, or siloxanes, i.e., compounds containing units of the formula (III) with f+g+h≤3, with silanes being preferred.

Examples of radical $R^6$ are the examples indicated for R.

Radical $R^6$ preferably comprises optionally halogen-substituted hydrocarbon radicals having 1 to 18 carbon atoms, more preferably hydrocarbon radicals having 1 to 5 carbon atoms, most preferably the methyl radical.

Examples of optionally substituted hydrocarbon radicals $R^7$ are the examples indicated for radical R.

The radicals $R^7$ are preferably hydrogen and optionally halogen-substituted hydrocarbon radicals having 1 to 18 carbon atoms, more preferably hydrogen and hydrocarbon radicals having 1 to 10 carbon atoms, and most preferably the methyl and ethyl radicals.

Examples of radicals D are radicals of the formulae $H_2N(CH_2)_3$—, $H_2N(CH_2)_2NH(CH_2)_3$—, $H_2N(CH_2)_2NH(CH_2)_2NH(CH_2)_3$—, $H_3CNH(CH_2)_3$—, $C_2H_5NH(CH_2)_3$—, $C_3H_7NH(CH_2)_3$—, $C_4H_9NH(CH_2)_3$—, $C_5H_{11}NH(CH_2)_3$—, $C_6H_{13}NH(CH_2)_3$—, $C_7H_{15}NH(CH_2)_3$—, $H_2N(CH_2)_4$—, $H_2N—CH_2—CH(CH3)-CH_2$—, $H_2N(CH_2)_5$—, cyclo-$C_5H_9NH(CH_2)_3$—, cyclo-$C_6H_{11}NH(CH_2)_3$—, phenyl-$NH(CH_2)_3$—, $(CH_3)_2N(CH_2)_3$—, $(C_2H_5)_2N(CH_2)_3$—, $(C_3H_7)_2N(CH_2)_3$—, $(C_4H_9)_2N(CH_2)_3$—, $(C_5H_{11})_2N(CH_2)_3$—, $(C_6H_{13})_2N(CH_2)_3$—, $(C_7H_{15})_2N(CH_2)_3$—, $H_2N(CH_2)$ $H_2N(CH_2)_2NH(CH_2)$—, $H_2N(CH_2)_2NH(CH_2)_2NH(CH_2)$—, $H_3CNH(CH_2)$—, $C_2H_5NH(CH_2)$—, $C_3H_7NH(CH_2)$—, $C_4H_9NH(CH_2)$—, $C_5H_{11}NH(CH_2)$—, $C_6H_{13}NH(CH_2)$—, $C_7H_{15}NH(CH_2)$—, cyclo-$C_5H_9NH(CH_2)$—, cyclo-$C_6H_{11}NH(CH_2)$—, phenyl-$NH(CH_2)$—, $(CH_3)_2N(CH_2)$—, $(C_2H_5)_2N(CH_2)$—, $(C_3H_7)_2N(CH_2)$—, $(C_4H_9)_2N(CH_2)$—, $(C_5H_{11})_2N(CH_2)$—, $(C_6H_{13})_2N(CH_2)$—, $(C_7H_{15})_2N(CH_2)$—, $(CH_3O)_3Si(CH_2)_3NH(CH_2)_3$—, $(C_2H_5O)_3Si(CH_2)_3NH(CH_2)_3$—, $(CH_3O)_2(CH_3)Si(CH_2)_3NH(CH_2)_3$—, and $(C_2H_5O)_2(CH_3)Si(CH_2)_3NH(CH_2)_3$— and also reaction products of the abovementioned primary amino groups with compounds which contain epoxide groups or double bonds that are reactive toward primary amino groups.

Radical D preferably comprises the $H_2N(CH_2)_3$—, $H_2N(CH_2)_2NH(CH_2)_3$—, and cyclo-$C_6H_{11}NH(CH_2)_3$ radical.

Examples of the silanes of the formula (III) that are used optionally in accordance with the invention are $H_2N(CH_2)_3—Si(OCH_3)_3$, $H_2N(CH_2)_3—Si(OC_2H_5)_3$, $H_2N(CH_2)_3—Si(OCH_3)_2CH_3$, $H_2N(CH_2)_3—Si(OC_2H_5)_2CH_3$, $H_2N(CH_2)_2NH(CH_2)_3—Si(OCH_3)_3$, $H_2N(CH_2)_2NH(CH_2)_3—Si(OC_2H_5)_3$, $H_2N(CH_2)_2NH(CH_2)_3—Si(OCH_3)_2CH_3$, $H_2N(CH_2)_2NH(CH_2)_3—Si(OC_2H_5)_2CH_3$, $H_2N(CH_2)_2NH(CH_2)_3—Si(OH)_3$, $H_2N(CH_2)_2NH(CH_2)_3—Si(OH)_2CH_3$, $H_2N(CH_2)_2NH(CH_2)_2NH(CH_2)_3—Si(OCH_3)_3$, $H_2N(CH_2)_2NH(CH_2)_2NH(CH_2)_3—Si(OC_2H_5)_3$, cyclo-$C_6H_{11}NH(CH_2)_3—Si(OCH_3)_3$, cyclo-$C_6H_{11}NH(CH_2)_3—Si(OC_2H_5)_3$, cyclo-$C_6H_{11}NH(CH_2)_3—Si(OCH_3)_2CH_3$, cyclo-$C_6H_{11}NH(CH_2)_3—Si(OC_2H_5)_2CH_3$, cyclo-$C_6H_{11}NH(CH_2)_3—Si(OH)_3$, cyclo-$C_6H_{11}NH(CH_2)_3—Si(OH)_2CH_3$, phenyl-$NH(CH_2)_3—Si(OCH_3)_3$, phenyl-$NH(CH_2)_3—Si(OC_2H_5)_3$, phenyl-$NH(CH_2)_3—Si(OCH_3)_2CH_3$, phenyl-$NH(CH_2)_3—Si(OC_2H_5)_2CH_3$, phenyl-$NH(CH_2)_3—Si(OH)_3$, phenyl-$NH(CH_2)_3—Si(OH)_2CH_3$, $HN((CH_2)_3—Si(OCH_3)_3)_2$, $HN((CH_2)_3—Si(OC_2H_5)_3)_2HN((CH_2)_3—Si(OCH_3)_2CH_3)_2$, $HN((CH_2)_3—Si(OC_2H_5)_2CH_3)_2$, cyclo-$C_6H_{11}NH(CH_2)—Si(OCH_3)_3$, cyclo-$C_6H_{11}NH(CH_2)—Si(OC_2H_5)_3$, cyclo-$C_6H_{11}NH (CH$_2$)—Si(OCH$_3$)$_2$CH$_3$, cyclo-C$_6$H$_{11}$NH(CH$_2$)—Si(OC$_2$H$_5$)$_2$CH$_3$, cyclo-C$_6$H$_{11}$NH(CH$_2$)—Si(OH)$_3$, cyclo-C$_6$H$_{11}$NH(CH$_2$)—Si(OH)$_2$CH$_3$, phenyl-NH(CH$_2$)—Si(OCH$_3$)$_3$, phenyl-NH(CH$_2$)—Si(OC$_2$H$_5$)$_3$, phenyl-NH(CH$_2$)—Si(OCH$_3$)$_2$CH$_3$, phenyl-NH(CH$_2$)—Si(OC$_2$H$_5$)$_2$CH$_3$, phenyl-NH(CH$_2$)—Si(OH)$_3$, and phenyl-NH(CH$_2$)—Si(OH)$_2$CH$_3$ and also their partial hydrolysates, with H$_2$N(CH$_2$)$_2$NH(CH$_2$)$_3$—Si(OCH$_3$)$_3$, H$_2$N(CH$_2$)$_2$NH(CH$_2$)$_3$—Si(OC$_2$H$_5$)$_3$, H$_2$N(CH$_2$)$_2$NH(CH$_2$)$_3$—Si(OCH$_3$)$_2$CH$_3$, cyclo-C$_6$H$_{11}$NH(CH$_2$)$_3$—Si(OCH$_3$)$_3$, cyclo-C$_6$H$_{11}$NH(CH$_2$)$_3$—Si(OC$_2$H$_5$)$_3$, and cyclo-C$_6$H$_{11}$NH(CH$_2$)$_3$—Si(OCH$_3$)$_2$CH$_3$ and also in each case their partial hydrolysates being preferred, and H$_2$N(CH$_2$)$_2$NH(CH$_2$)$_3$—Si(OCH$_3$)$_3$, H$_2$N(CH$_2$)$_2$NH(CH$_2$)$_3$—Si(OCH$_3$)$_2$CH$_3$, cyclo-C$_6$H$_{11}$NH(CH$_2$)$_3$—Si(OCH$_3$)$_3$, cyclo-C$_6$H$_{11}$NH(CH$_2$)$_3$—Si(OCH$_3$)$_2$CH$_3$ and also in each case their partial hydrolysates being particularly preferred.

The cocatalysts (C2) used in accordance with the invention are commercial products and/or are preparable by methods which are common in chemistry.

In the compositions of the invention, the molar ratio of the compounds (C1) to radicals D in compound (C2) is preferably 1:2 to 1:200, more preferably 1:3 to 1:100, and most preferably 1:10 to 1:80.

The crosslinkable compositions of the invention preferably comprise components (C1) and (C2) in a total amount of from 0.3 to 35 parts by weight, more preferably from 0.6 to 30 parts by weight, in each case per 100 parts by weight of component (A).

In addition to the components (A), (B), (C1) and (C2), the compositions of the invention may comprise all further substances which are useful in crosslinkable compositions and which are different from components (A), (B), (C1), and (C2), examples being nonreactive plasticizers (D), fillers (E), adhesion promoters (F), water scavengers (G), additives (H), and adjuvants (I).

Nonreactive plasticizers (D) for the purposes of the present invention are all organic compounds which at temperatures <80° C. react neither with water nor with the components (A), (B), (C1), and (C2), which are liquid at 20° C. and 1013 hPa, which have a boiling point >250° C. at 1013 hPa, and which are selected from
  fully esterified aromatic or aliphatic carboxylic acids,
  fully esterified derivatives of phosphoric acid,
  fully esterified derivatives of sulfonic acids,
  branched or unbranched saturated hydrocarbons,
  polystyrenes,
  polybutadienes,
  polyisobutylenes,
  polyesters, and
  polyethers.

Examples of carboxylic esters (D) are phthalic esters such as dioctyl phthalate, diisooctyl phthalate, and diundecyl phthalate; perhydrogenated phthalic esters such as diisononyl 1,2-cyclohexanedicarboxylate and dioctyl 1,2-cyclohexanedicarboxylate; adipic esters such as dioctyl adipate; benzoic esters; esters of trimellitic acid, glycol esters; esters of saturated alkanediols, such as 2,2,4-trimethyl-1,3-pentanediol monoisobutyrates and 2,2,4-trimethyl-1,3-pentanediol diisobutyrates.

Examples of polyethers (D) are polyethylene glycols, polyTHF and polypropylene glycols having molar masses of preferably 200 to 20,000 g/mol.

Preferred for use as plasticizers (D) having molar masses or, in the case of polymeric plasticizers, average molar masses $M_n$ of at least 200 g/mol, more preferably greater than 500 g/mol, and most preferably greater than 900 g/mol. They preferably possess molar masses, or average molar masses $M_n$, of at most 20 000 g/mol, more preferably of at most 10,000 g/mol, and most preferably not more than 8000 g/mol.

Preferred for use as component (D) are plasticizers that are free from phthalic esters, such as perhydrogenated phthalic esters, esters of trimellitic acid, polyesters or polyethers.

With particular preference, plasticizers (D) are polyethers, more preferably polyethylene glycols, polyTHF, and polypropylene glycols, most preferably polypropylene glycols. These preferred polyethers (D) preferably have molar masses of between 400 and 20,000 g/mol, more preferably between 800 and 12,000 g/mol, and most preferably between 1000 and 8000 g/mol.

If the compositions of the invention comprise plasticizers (D), the amounts are preferably 5 to 300 parts by weight, more preferably 10 to 150 parts by weight, and most preferably 26 to 100 parts by weight, in each case per 100 parts by weight of component (A). The compositions of the invention preferably comprise plasticizers (D).

The fillers (E) optionally employed in the compositions of the invention may be any desired fillers known to date. Examples of fillers (E) are non-reinforcing fillers, these being fillers preferably having a BET surface area of preferably up to 50 m$^2$/g, such as quartz, diatomaceous earth, calcium silicate, zirconium silicate, talc, kaolin, zeolites, metal oxide powders, such as aluminum oxides, titanium oxides, iron oxides or zinc oxides, and/or their mixed oxides, barium sulfate, calcium carbonate, gypsum, silicon nitride, silicon carbide, boron nitride, glass powders, and polymeric powders, such as polyacrylonitrile powders; reinforcing fillers, these being fillers having a BET surface area of more than 50 m$^2$/g, such as pyrogenically prepared silica, precipitated silica, precipitated chalk, carbon black, such as furnace black and acetylene black, and mixed silicon aluminum oxides with high BET surface areas; aluminum trihydroxide, fillers in hollow bead form, such as ceramic microbeads, elastic polymeric beads, glass beads, or fillers in fiber form. The stated fillers may have been hydrophobized, by treatment for example with organosilanes and/or organosiloxanes or with stearic acid, or by etherification of hydroxyl groups to alkoxy groups.

The optionally employed fillers (E) are preferably calcium carbonate, talc, aluminum trihydroxide, and silica. Preferred types of calcium carbonate are ground or precipitated and optionally surface-treated with fatty acids such as stearic acid or salts thereof. The preferred silica is preferably fumed silica.

Optionally employed fillers (E) have a moisture content of preferably below 1 wt %, more preferably below 0.5 wt %.

If the compositions of the invention do comprise fillers (E), the amounts are preferably 10 to 2000 parts by weight, and most preferably 40 to 1000 parts by weight, more particularly 80 to 500 parts by weight, in each case per 100 parts by weight of constituent (A). The compositions of the invention preferably do comprise fillers (E).

In one particularly preferred implementation of the invention, the compositions of the invention comprise as fillers (E) a combination of
  a) silica, more particularly fumed silica, and
  b) calcium carbonate, aluminum trihydroxide and/or talc.

If the compositions of the invention do comprise this particularly preferred combination of different fillers (E), they preferably comprise from 1 to 50 parts by weight, more preferably 5 to 20 parts by weight, of silica, more preferably fumed silica, and preferably 10 to 500 parts by weight, more preferably 50 to 300 parts by weight, of calcium carbonate, aluminum trihydroxide, talc or mixtures of these materials, in each case per 100 parts by weight of constituent (A).

In another particularly preferred implementation of the invention, the compositions of the invention comprise as fillers (E) exclusively carbon carbonate, aluminum trihydroxide and/or talc preferably in amounts totaling 10 to 500 parts by weight, more preferably 50 to 300 parts by weight, in each case per 100 parts by weight of constituent (A).

The adhesion promoters (F) employed optionally in the compositions of the invention may be any desired adhesion promoters useful for systems which cure by silane condensation.

Examples of adhesion promoters (F) are epoxy silanes such as glycidyloxypropyltrimethoxysilanes, glycidyloxypropyl-methyldimethoxysilane, glycidyloxypropyltriethoxysilane or glycidyloxypropylmethyldiethoxysilane, 2-(3-triethoxysilylpropyl)maleic anhydride, N-(3-trimethoxysilylpropyl)urea, N-(3-triethoxysilylpropyl)urea, N-(trimethoxysilylmethyl)urea, N-(methyldimethoxysilylmethyl)urea, N-(3-triethoxysilylmethyl)urea, N-(3-methyldiethoxysilylmethyl)urea, O-methylcarbamatomethyl-methyldimethoxysilane, O-methylcarbamatomethyltrimethoxysilane, O-ethylcarbamatomethylmethyldiethoxysilane, O-ethylcarbamatomethyltriethoxysilane, 3-methacryloyloxypropyltrimethoxysilane, methacryloyloxymethyltrimethoxysilane, methacryloyloxymethylmethyl-dimethoxysilane, methacryloyloxymethyltriethoxysilane, methacryloyloxymethylmethyldiethoxysilane, 3-acryloyloxypropyltrimethoxysilane, acryloyloxymethyltrimethoxysilane, acryloyloxymethylmethyldimethoxysilanes, acryloyloxymethyltriethoxysilane, and acryloyloxymethylmethyldiethoxysilane, and also their partial condensates.

If the compositions of the invention contain adhesion promoters (F), the amounts are preferably 0.5 to 30 parts by weight, more preferably 1 to 10 parts by weight, in each case per 100 parts by weight of crosslinkable composition.

The water scavengers (G) optionally employed in the compositions of the invention may be any desired water scavengers described for systems which cure by silane condensation.

Examples of water scavengers (G) are silanes such as vinyltrimethoxysilane, vinyltriethoxysilane, vinylmethyl-dimethoxysilane, tetraethoxysilane, O-methyl-carbamatomethylmethyldimethoxysilane, O-methylcarbamato-methyltrimethoxysilane, O-ethylcarbamatomethylmethyldiethoxysilane, O-ethylcarbamatomethyltriethoxysilane, and/or their partial condensates, and also orthoesters, such as 1,1,1-trimethoxyethane, 1,1,1-triethoxyethane, trimethoxymethane, and triethoxymethane, preference being given to vinyltrimethoxysilane.

If the compositions of the invention contain water scavengers (G), the amounts are preferably 0.5 to 30 parts by weight, more preferably 1 to 10 parts by weight, in each case per 100 parts by weight of crosslinkable composition. The compositions of the invention preferably do comprise water scavengers (G).

The additives (H) employed optionally in the compositions of the invention may be any desired additives known to date that are typical of silane-crosslinking systems.

The additives (H) employed optionally in accordance with the invention are compounds which are different from components (A) to (G), preferably antioxidants, UV stabilizers, such as HALS compounds, for example, fungicides, commercial defoamers, those from BYK (Wesel, Germany), for example, commercial wetting agents, from BYK (Wesel, Germany), for example, and pigments.

If the compositions of the invention contain additives (H), the amounts are preferably 0.01 to 30 parts by weight, more preferably 0.1 to 10 parts by weight, in each case per 100 parts by weight of constituent (A). The compositions of the invention preferably do comprise additives (H).

The adjuvants (I) employed optionally in accordance with the invention, which are different from component (H), are preferably reactive plasticizers, rheological additives, flame retardants, and organic solvents.

Preferred reactive plasticizers (I) are silanes which contain alkyl chains having 6 to 40 carbon atoms and possess a group which is reactive toward the compounds (A). Examples are isooctyltrimethoxysilane, isooctyl-triethoxysilane, N-octyltrimethoxysilane, N-octyltri-ethoxysilane, decyltrimethoxysilane, decyltriethoxysilane, dodecyltrimethoxysilane, dodecyltriethoxysilane, tetradecyltrimethoxysilane, tetradecyltriethoxysilane, hexadecyltrimethoxysilane, and hexadecyltriethoxysilane.

The rheological additives (I) are preferably compounds which are solid at room temperature and under a pressure of 1013 hPa, preferably polyamide waxes, hydrogenated caster oils, or stearates.

As flame retardants (I) it is possible to use any typical flame retardants of the kind typical for adhesive and sealant systems, more particularly halogenated compounds and derivatives.

Examples of organic solvents (I) are the compounds already stated above as solvents (BL), preferably alcohols.

It is preferred not to add any organic solvents (I) to the compositions of the invention.

If the compositions of the invention contain one or more components (I), the amounts are preferably 0.5 to 200 parts by weight, more preferably 1 to 100 parts by weight, and most preferably 2 to 70 parts by weight, in each case per 100 parts by weight of component (A).

The compositions of the invention are preferably compositions comprising
(A) 100 parts by weight of compounds of the formula (I),
(B) 5-60 parts by weight of silicone resins consisting of units of the formula (II), preferably comprising resins (B1),
(C1) catalyst(s) selected from metal-containing curing catalysts, guanidines, and amidines,
(C2) cocatalyst(s) consisting of units of the formula (III), with the proviso that the molar ratio of compounds (C1) to radicals D in compounds (C2) is 1:1 to 1:200 and the crosslinkable compositions comprise components (C1) and (C2) in a total amount of 0.2 to 50 parts by weight per 100 parts by weight of component (A),
optionally
(D) plasticizers,
optionally
(E) fillers,
optionally
(F) adhesion promoters,
optionally
(G) water scavengers,
optionally
(H) additives, and
optionally
(I) adjuvants.

With particular preference the compositions of the invention are compositions comprising
(A) 100 parts by weight of compounds of the formula (I),
(B) 5-60 parts by weight of silicone resins consisting of units of the formula (II), preferably comprising resins (B1), (C1) catalyst(s) selected from metal-containing curing catalysts, guanidines, and amidines,
(C2) cocatalyst(s) consisting of units of the formula (III), with the proviso that the molar ratio of compounds (C1) to radicals D in compounds (C2) is 1:2 to 1:200 and the crosslinkable compositions comprise components (C1) and (C2) in a total amount of 0.3 to 35 parts by weight per 100 parts by weight of component (A),
(D) 5 to 300 parts by weight of plasticizers,
optionally
(E) fillers,
optionally
(F) adhesion promoters,
optionally
(G) water scavengers,
optionally
(H) additives, and
optionally
(I) adjuvants.

Very preferably, the compositions of the invention are compositions comprising
(A) 100 parts by weight of compounds of the formula (I),
(B) 5-60 parts by weight of silicone resins consisting of units of the formula (II), preferably comprising resins (B1),
(C1) catalyst(s) selected from metal-containing curing catalysts, guanidines, and amidines,
(C2) cocatalyst(s) consisting of units of the formula (III), with the proviso that the molar ratio of compounds (C1) to radicals D in compounds (C2) is 1:2 to 1:200 and the crosslinkable compositions comprise components (C1) and (C2) in a total amount of 0.3 to 35 parts by weight per 100 parts by weight of component (A),
(D) 5 to 300 parts by weight of plasticizers,
(E) 40 to 1000 parts by weight of fillers,
optionally
(F) adhesion promoters,
optionally
(G) water scavengers,
optionally
(H) additives, and
optionally
(I) adjuvants.

Very preferably, the compositions of the invention are compositions comprising
(A) 100 parts by weight of compounds of the formula (I), in which Y is a polypropylene oxide radical,
(B) 10-50 parts by weight of silicone resins (B1) consisting of units of the formula (II),
(C1) catalyst(s) selected from tin-containing compounds,
(C2) cocatalyst(s) consisting of units of the formula (III), with the proviso that the molar ratio of compounds (C1) to radicals D in compounds (C2) is 1:2 to 1:200 and the crosslinkable compositions comprise components (C1) and (C2) in a total amount of 0.3 to 35 parts by weight per 100 parts by weight of component (A),
(D) 30-150 parts by weight of plasticizers,
(E) 60 to 500 parts by weight of fillers, optionally
(F) adhesion promoters,
(G) 0.5 to 30 parts by weight of water scavengers,
(H) 0.1 to 10 parts by weight of additives selected from antioxidants and UV stabilizers, and
optionally
(I) adjuvants.

The compositions of the invention, apart from the stated components (A) to (I), preferably comprise no other constituents.

The components used in accordance with the invention may in each case be one kind of such a component or else a mixture of at least two kinds of a respective component.

The compositions of the invention are preferably compositions with a consistency from thick to paste-like, having viscosities of preferably 500 to 3,000,000 mPas, more preferably from 15000 to 1,500,000 mPas, in each case at 25° C.

The compositions of the invention may be produced in any way known per se, such as, for instance, by methods and mixing techniques of the kind customary for the production of moisture-curing compositions. The sequence in which the various constituents are mixed with one another may be varied arbitrarily.

A further subject of the present invention is a process for producing the composition of the invention by mixing of the individual components in any order.

This mixing may take place at room temperature and under the pressure of the surrounding atmosphere, in other words at about 900 to 1100 hPa. Alternatively, if desired, this mixing may take place at higher temperatures, as for example at temperatures in the range from 30 to 130° C. A further possibility is to carry out mixing temporarily or continuously under reduced pressure, such as at 30 to 500 hPa absolute pressure, for example, in order to remove volatile compounds and/or air.

The mixing of the invention takes place preferably in the absence of moisture.

The process of the invention may be carried out continuously or discontinuously.

The compositions of the invention are preferably one-component crosslinkable compositions. Alternatively the compositions of the invention may be part of two-component crosslinking systems with which OH-containing compounds, such as water, are added in a second component.

The compositions of the invention can be stored in the absence of water and are crosslinkable on ingress of water.

The usual water content of the air is enough for the crosslinking of the compositions of the invention. The compositions of the invention are crosslinked preferably at room temperature. Crosslinking may, if desired, also be carried out at higher or lower temperatures than room temperature, such as at −5° to 15° C. or at 30° to 50° C., for example, and/or by means of water concentrations exceeding the normal water content of the air. Crosslinking is carried out preferably under a pressure of 100 to 1100 hPa, more particularly under the pressure of the surrounding atmosphere, in other words about 900 to 1100 hPa.

A further subject of the present invention are shaped articles produced by crosslinking the compositions of the invention.

The shaped articles of the invention preferably have a tensile strength of at least 1 MPa, more preferably at least 1.5 MPa, and most preferably of at least 2 MPa, in each case measured in accordance with DIN EN 53504.

The shaped articles of the invention may be any desired shaped articles, such as gaskets, compression moldings, extruded profiles, coatings, impregnated systems, castings, lenses, prisms, polygonal structures, laminate layers or adhesive layers.

A further subject of the invention is a process for producing composite materials, where the composition of the invention is applied to at least one substrate and subsequently allowed to crosslink.

Examples thereof are coatings, castings, the production of shaped items, composite materials, and composite moldings. Composite moldings are intended here to refer to a unitary shaped item comprising a composite material which is composed of a crosslinking product of the compositions of the invention and of at least one substrate in such a way that there is a firm, durable bond between the two parts.

In the process of the invention for producing composite materials, the composition of the invention may also be vulcanized between at least two identical or different substrates, as in the case of adhesive bonds, laminates or encapsulated systems, for example.

Examples of substrates which may be sealed or adhesively bonded in accordance with the invention are plastics including PVC, concrete, wood, mineral substrates, metals, glass, ceramic, and coated surfaces.

The compositions of the invention may be employed for all end uses for which it is possible to employ compositions which are storable in the absence of water and which crosslink to elastomers at room temperature on ingress of water.

The compositions of the invention are outstandingly suitable accordingly, for example, as sealants for joints, including vertical joints, and similar empty spaces of, for example, 10 to 40 mm internal width, as for example in buildings, land vehicles, water craft and aircraft, for the sealing of expanses, such as of roofs, walls or floors, or as adhesives or putties, in window construction or in the manufacture of glass cabinets, for example, and also in the production of protective coverings, or of anti-slip coverings, or of shaped elastomeric articles, for example, and also for the insulation of electrical or electronic apparatus.

An advantage of the compositions of the invention is that they are easy to produce.

The crosslinkable compositions of the invention have the advantage that they are notable for very high stability in storage and for a high crosslinking rate. Furthermore, the crosslinkable compositions of the invention have the advantage of an excellent adhesion profile.

A further advantage of the crosslinkable compositions of the invention is that they are easy to process.

Unless indicated otherwise, all of the operations in the examples below are carried out under the pressure of the surrounding atmosphere, in other words at about 1013 hPa, and at room temperature, in other words at about 23° C., or at a temperature which comes about when the reactants are combined at room temperature without additional heating or cooling. The crosslinking of the compositions is carried out at a relative atmospheric humidity of about 50%. Moreover, all parts and percentages are by weight unless otherwise indicated.

Example 1

A 2 l four-neck flask with dropping funnel, Liebig condenser, KPG stirrer, and thermometer is charged with 1000 g of phenyltrimethoxysilane at room temperature, and 20 g of 20% strength aqueous hydrochloric acid are added to this initial charge with stirring. This is followed by heating to a temperature of 65-68° C. until a gentle reflux begins. Subsequently, under reflux, a mixture of 74 g of water and 40 g of methanol is added at a uniform rate over the course of 30 minutes. After the end of the addition, stirring is continued under reflux for 10 minutes more, followed by cooling to room temperature.

The reaction mixture is left to stand at room temperature for around 16 hours, after which 60 g of sodium hydrogencarbonate are added with stirring and, after stirring for 30 minutes, the resultant solid is isolated by filtration. Lastly the low boilers (essentially methanol) are removed by distillation. In this operation, initially around 80-90% of the quantity of distillate to be taken off is removed at 1013 mbar at a temperature of 120° C., after which the pressure is reduced to 10 mbar and the remaining low-boiling residues are distilled off over the subsequent 15-20 minutes.

A phenylsilicone resin is obtained which has an average molar mass Mn of 1200 g/mol, a viscosity of 30 mPas at 23° C., and a methoxy group content of 18% based on the entire resin mass.

Example 2

The procedure of example 1 is repeated. However, the ingredients and their quantities are varied as follows. Instead of 1000 g of phenyltrimethoxysilane, a mixture of 700 g of phenyltrimethoxysilane and 300 g of methyltrimethoxysilane is introduced as the initial charge. And, after the addition of salt, which remains the same, and the heating to a temperature of 65-68° C., the mixture added at a uniform rate over the course of 30 minutes under reflux is a mixture of 92.5 g of water and 62 g of methanol rather than a mixture of 74 g of water and 40 g of methanol. All of the other process parameters, ingredients and quantities thereof remain unchanged.

A phenylmethylsilicone resin is obtained which has an average molar mass Mn of 1100 g/mol, a viscosity of 30 mPas at 23° C., and a methoxy group content of 19% based on the entire resin mass.

Example 3

Production of an Inventive Adhesive Formulation 85.6 g of silane-terminated polypropylene glycol having an average molar mass ($M_n$) of 18,000 g/mol and two end groups of the formula —O—C(=O)—NH—(CH$_2$)$_3$—Si(OCH$_3$)$_3$ (available commercially under the name GENIOSIL® STP-E35 from Wacker Chemie AG, Munich, Germany) and 59.2 g of polypropylene glycol having an average molar mass $M_n$ of 2000 g/mol are mixed and homogenized in a laboratory planetary mixer from PC-Laborsystem, equipped with two cross-arm mixers are homogenized at 200 rpm for 2 minutes and at about 25° C. with 8.0 g of vinyltrimethoxysilane, 54.4 g of a resin prepared according to example 1, and 2.0 g of a stabilizer mixture (mixture available commercially under the name TINUVIN® B 75 from BASF AG (Germany) and composed of 20% Irganox® 1135 (CAS No. 125643-61-0), 40% Tinuvin® 571 (CAS No. 23328-53-2) and 40% Tinuvin® 765 (CAS No. 41556-26-7)). Incorporated subsequently at 600 rpm in one minute with stirring are 186.0 g of a precipitated chalk having a coating of fatty acid and having an average particle diameter (D50%) of around 0.07 μm (available commercially under the name Hakuenka® CCR S10 from Shiraishi Omya GmbH, Gummern, Austria). Following incorporation of the chalk, 4 g of aminopropyltrimethoxysilane and 0.8 g of dioctyltin dilaurate are mixed in at 200 rpm for 1 minute. Finally, homogenization takes place at 600 rpm for 2 minutes and at 200 rpm for 1 minute, under a pressure around 100 mbar, with stirring until absence of bubbles.

The resulting composition is dispensed into 310 ml PE cartridges, which are given an airtight seal and are stored at 20° C. for 24 hours before the study.

Example 4

Production of an Inventive Adhesive Formulation

The procedure described in example 3 is repeated. However, the amounts of GENIOSIL® STP-E35 and the phenylsilicone resin prepared according to example 1 that were indicated in example 3 are varied.

Here, accordingly, 103.6 g of GENIOSIL® STP-E35 and 36.4 g of a resin prepared according to example 1 are used. The amounts used of all other starting materials remain unchanged.

The resulting composition is dispensed into 310 ml PE cartridges, which are given an airtight seal and are stored at 20° C. for 24 hours before the study.

Example 5

Production of an Inventive Adhesive Formulation

The procedure described in example 3 is repeated. However, the amounts that were indicated in example 3 of GENIOSIL® STP-E35 and the phenylsilicone resin prepared according to example 1 are varied.

Here, accordingly, 122.0 g of GENIOSIL® STP-E35 and 18.0 g of a solvent-free resin prepared according to example 1 are used. The amounts used of all other starting materials remain unchanged.

The resulting composition is dispensed into 310 ml PE cartridges, which are given an airtight seal and are stored at 20° C. for 24 hours before the study.

Comparative Example 1

Production of a Noninventive Adhesive Formulation

The procedure described in example 3 is repeated. However, the phenylsilicone resin prepared according to example 1 is not added. Instead, 140 g rather than 85.6 g of GENIOSIL® STP-E35 are used.

The resulting composition is dispensed into 310 ml PE cartridges, which are given an airtight seal and are stored at 20° C. for 24 hours before the study.

Comparative Example 2

Production of a Noninventive Adhesive Formulation

The procedure described in example 3 is repeated. However, dioctyltin dilaurate is not added. Instead, the amount of polypropylene glycol with an average molar mass $M_n$ of 2000 that is used is increased slightly from 59.2 g to 60 g. The amounts used of all other starting materials remain unchanged.

Example 6

The compositions obtained in examples 3 to 5 and also in comparative examples 1 and 2 (C1 and C2) are allowed to crosslink and are studied for their skin-forming and their mechanical properties. The results are found in table 1.

Skin-Forming Time (SFT)

For the determination of the skin-forming time, the crosslinkable compositions obtained in the examples are applied as a layer 2 mm thick to PE film and are stored under standard conditions (23° C. and 50% relative humidity). In the course of curing, the formation of a skin is tested every 5 minutes. This is done by carefully placing a dry laboratory spatula onto the surface of the sample and pulling it upward. If sample sticks to the finger, a skin has not yet formed. When sample no longer sticks to the finger, a skin has formed and the time is recorded.

Mechanical Properties

The compositions were each coated out to a depth of 2 mm on milled-out Teflon plates and cured for 2 weeks at 23° C. and 50% relative humidity.

Shore A hardness is determined according to DIN 53505. Tensile strength is determined according to DIN 53504-S1. Elongation at break is determined according to DIN 53504-S1.

TABLE 1

|  | Composition from example | | | | |
|---|---|---|---|---|---|
|  | 3 | 4 | 5 | C1 | C2 |
| Ratio of component (B) to component (A) | 0.63 | 0.35 | 0.15 | 0.00 | 0.63 |
| Catalyst mixture of (C1) and (C2) | yes | yes | yes | yes | no |
| Skin-forming time [min] | 126 | 94 | 36 | 8 | >1000 |
| Shore A hardness | 63 | 54 | 50 | 50 | n.d. |
| Tensile strength [N/mm$^2$] | 4.5 | 5.6 | 4.1 | 3.2 | n.d. |
| Elongation at break [%] | 612 | 748 | 680 | 418 | n.d. | n.d.: not determinable

A comparison of examples 3, 4, 5, and C1 shows that the inventive systems which comprise phenylsilicone resins (component (B)) exhibit not only much better tensile strengths but also, surprisingly, substantially better elongations at break than noninventive compositions without component (B).

At the same time a comparison of the same examples shows that the skin-forming time is significantly prolonged, surprisingly, by the addition of phenylsilicone resins (component (B)). Without the combined use of components (C1) and (C2), curing times relevant in practice cannot be achieved (cf. comparative example 2).

Example 7

Production of an Inventive Adhesive Formulation 160.0 g of silane-terminated polypropylene glycol having an average molar mass (1%) of 18,000 g/mol and two end groups of the formula —O—C(=O)—NH—(CH$_2$)$_3$—Si(OCH$_3$)$_3$ (available commercially under the name GENIOSIL® STP-E35 from Wacker Chemie AG, Munich, Germany) are homogenized in a laboratory planetary mixer from PC-Laborsystem, equipped with two cross-arm mixers are homogenized at 200 rpm for 2 minutes and at about 25° C. with 42.0 g of a solvent-free resin prepared according to example 1 and 2.0 g of a stabilizer mixture (available commercially under the name TINUVIN® B 75 from BASF AG, Germany). Incorporated subsequently at 600 rpm for one minute with stirring are 189.6 g of aluminum trihydroxide having a BET surface area of 3-5 m$^2$/g and a d50 of 1.7-2.1 μm (available commercially under the name Martinal® OL 104 from Albemarle Corp.). Following incorporation of the filler, 6 g of aminopropyltrimethoxysilane and 0.4 g of dioctyltin dilaurate are mixed in at 200 rpm for 1 minute. Finally, homogenization takes place at 600 rpm for 2 minutes and at 200 rpm for 1 minute, under a pressure around 100 mbar, with stirring until absence of bubbles.

The resulting composition is dispensed into 310 ml PE cartridges, which are given an airtight seal and are stored at 20° C. for 24 hours before the study.

Example 8

Production of an Inventive Adhesive Formulation

The procedure described in example 7 is repeated. However, instead of 0.4 g of dioctyltin dilaurate, 0.4 g of 1,8-diazabicyclo[5.4.0]undec-7-ene (DBU, available commercially under the name Lupragen® N 700 from BASF AG, Germany) is used.

The resulting composition is dispensed into 310 ml PE cartridges, which are given an airtight seal and are stored at 20° C. for 24 hours before the study.

Example 9

Production of an Inventive Adhesive Formulation

The procedure described in example 7 is repeated. However, instead of 0.4 g of dioctyltin dilaurate, 0.4 g of diisopropoxytitanium-ethylene acetoacetate (available commercially under the name "Tyzor® IBAY" from Dorf Ketal Chemicals Pvt. Ltd., Stafford, USA) is used.

The resulting composition is dispensed into 310 ml PE cartridges, which are given an airtight seal and are stored at 20° C. for 24 hours before the study.

Comparative Example 3

Production of a Noninventive Adhesive Formulation

The procedure described in example 7 is repeated. However, the addition of 0.4 g of dioctyltin dilaurate is omitted without replacement.

The resulting composition is dispensed into 310 ml PE cartridges, which are given an airtight seal and are stored at 20° C. for 24 hours before the study.

Example 10

The compositions obtained in examples 7 to 9 and also in comparative example 3 (C3) are allowed to crosslink and are studied for their skin-forming and their mechanical properties. The results are found in table 2.

Skin-Forming Time (SFT)

The skin-forming time is determined as described in example 6.

Mechanical Properties

The tensile shear strengths are determined as described in DIN EN 204. Here, in the determination of the tensile shear strengths, the respective composition is applied to both beech blocks to be bonded, followed by drawdown with a 100 µm doctor blade. The two wooden blocks are then bonded over an area of one times 2 cm, with an applied pressure of 5 kg. After 24 hours of pressure application, the blocks are stored under standard conditions. For the determination of the D1 value, the storage time is 7 days. Thereafter the tensile shear strength of the two bonded blocks is measured directly. In the case of the D4 measurement, the storage time under standard conditions is 21 days, after which there is additional storage in boiling water for six hours. After the blocks are removed from the water, dried off, and stored at room temperature for an hour. This is followed by the determination of the tensile shear strength.

TABLE 2

|  | Composition from example | | | |
|---|---|---|---|---|
|  | 7 | 8 | 9 | C3 |
| SFT [min] | 97 | 60 | 336 | 1165 |
| D1 measurement [MPa] | 5.7 | 5.1 | 5.4 | 3.8 |
| D4 measurement [MPa] | 2.3 | 2.1 | 2.0 | 1.6 |

Example 11

Production of an Inventive Adhesive Formulation

The procedure described in example 5 is repeated. However, instead of 18 g of phenylsilicone resin prepared according to example 1, 18 g of phenylmethylsilicone resin prepared according to example 2 are used. All other operating parameters, ingredients and their amounts remain unchanged.

The resulting composition is dispensed into 310 ml PE cartridges, given an airtight seal, and stored at 20° C. for 24 hours prior to study.

On determination of skin-forming time and mechanical properties in accordance with the procedure described in example 6, the values found are as follows:

Skin-forming time: 21 min
Shore A hardness: 49
Tensile strength: 3.6 N/mm$^2$
Elongation at break: 486%

The invention claimed is:
1. A crosslinkable composition, comprising:
(A) 100 parts by weight of compound(s) of the formula

$$Y-[(CR^1_2)_3-SiR_a(OR^2)_{3-a}]_b \qquad (I),$$

where
Y is a b-valent polymer radical bonded via a nitrogen, oxygen, sulfur or carbon atom contained in the b-valent polymer radical to a carbon of $(CR^1_2)_3$,
R are identical or different monovalent, optionally substituted hydrocarbon radicals,
$R^1$ are identical or different and are hydrogen or a monovalent optionally substituted hydrocarbon radical, which may be attached via nitrogen, phosphorus, oxygen, sulfur or a carbonyl group to the carbon atom of $CR^1_2$,
$R^2$ are identical or different and are hydrogen or a monovalent, optionally substituted hydrocarbon radical,
b is an integer from 1 to 10, and
a is 0, 1 or 2,
(B) at least 5 parts by weight of one or more silicone resins comprising units of the formula

$$R^3_c(R^4O)_dR^5_eSiO_{(4-c-d-e)/2} \qquad (II),$$

where
$R^3$ are identical or different and are hydrogen, monovalent, SiC-bonded, optionally substituted aliphatic hydrocarbon radicals, or divalent, optionally substituted, aliphatic hydrocarbon radicals which bridge two units of the formula (II),
$R^4$ are identical or different and are hydrogen or a monovalent, optionally substituted hydrocarbon radical,
$R^5$ are identical or different and are monovalent, SiC-bonded, optionally substituted aromatic hydrocarbon radicals, c is 0, 1, 2 or 3,
d is 0, 1, 2 or 3, and
e is 0, 1 or 2,
with the proviso that
the sum of c+d+e is less than or equal to 3 and in at least 40% of the units of the formula (II) the sum c+e is 0 or 1,
(C1) at least one metal-containing curing catalyst, guanidine catalyst, or amidine catalyst, and
(C2) at least one cocatalyst comprising units of the formula

 (III), in which
$R^6$ are identical or different and are a monovalent, optionally substituted SiC-bonded, nitrogen-free organic radicals,
$R^7$ are identical or different and are hydrogen or an optionally substituted hydrocarbon radical,
D are identical or different monovalent, SiC-bonded radical having at least one nitrogen atom not bonded to a carbonyl group (C=O),
f is 0, 1, 2 or 3,
g is 0, 1, 2 or 3, and
h is 0, 1, 2, 3 or 4,
with the proviso that the sum of f+g+h is less than or equal to 4 and per molecule there is at least one radical D present,
where the molar ratio of compounds (C1) to radicals D in compounds (C2) is 1:1 to 1:400 and the crosslinkable composition comprises components (C1) and (C2) in a total amount of 0.2 to 50 parts by weight per 100 parts by weight of component (A), and also
(E) calcium carbonate, aluminum trihydroxide and/or talc in amounts of in total 10 to 500 parts by weight.

2. The crosslinkable composition of claim 1, wherein radical Y comprises polyurethane radicals or polyoxyalkylene radicals.

3. The crosslinkable composition of claim 1, wherein component (B) comprises silicone resins (B1) which, based on the total number of units of the formula (II), have at least 20% of units of the formula (II) in which e is 1.

4. The crosslinkable composition of claim 1, wherein plasticizer(s) (D) are present in amounts of 5 to 300 parts by weight per 100 parts by weight of component (A).

5. The crosslinkable composition of claim 1, wherein catalyst(s) (C1) are tin-containing compounds.

6. The crosslinkable composition of claim 1, wherein the molar ratio of the compound(s) (C1) to radicals D in compound (C2) is 1:2 to 1:200.

7. The crosslinkable composition of claim 1, wherein the composition comprises:
(A) 100 parts by weight of compound(s) of the formula (I),
(B) 5-60 parts by weight of silicone resin(s) consisting of units of the formula (II),
(C1) catalyst(s) selected from metal-containing curing catalysts, guanidines, and/or amidines,
(C2) cocatalyst(s) consisting of units of the formula (III), with the proviso that the molar ratio of compounds (C1) to radicals D in compounds (C2) is 1:2 to 1:200 and the crosslinkable composition comprises components (C1) and (C2) in a total amount of 0.3 to 35 parts by weight per 100 parts by weight of component (A),
(D) 5 to 300 parts by weight of plasticizers,
(E) calcium carbonate, aluminum hydroxide and/or talc in amounts of in total 10 to 500 parts by weight,
(F) optionally, adhesion promoters,
(G) optionally, water scavengers,
(H) optionally, additives, and
(I) optionally, adjuvants.

8. A process for producing a composition of claim 1, comprising mixing the individual components in any order.

9. A shaped article produced by crosslinking a composition of claim 1.

10. A process for producing a composite material, comprising applying a composition of claim 1 to at least one substrate and crosslinking the composition.

11. The composition of claim 1, wherein b is 1, 2, or 3.

12. The composition of claim 1, wherein b is 1 or 2.

13. The composition of claim 1, wherein d is 0 or 1.

14. The composition of claim 1, wherein e is 0, or 1.

* * * * *